US 6,910,700 B2
Jun. 28, 2005

(12) United States Patent
Kayne

(54) STONE GUARD FOR STEP BAR

(76) Inventor: Jeffrey Kayne, 50365 N. Ave., Macomb, MI (US) 48048

( * ) Notice: Subject to any disclaimer, the term of this patent is extended or adjusted under 35 U.S.C. 154(b) by 44 days.

(21) Appl. No.: 10/156,506

(22) Filed: May 28, 2002

(65) Prior Publication Data

US 2003/0160417 A1 Aug. 28, 2003

Related U.S. Application Data

(60) Provisional application No. 60/358,762, filed on Feb. 22, 2002.

(51) Int. Cl.[7] .............................................. B60R 3/00
(52) U.S. Cl. ..................... 280/164.2; 280/169
(58) Field of Search ................... D12/203; 280/163, 280/164.1, 164.2, 169, 851

(56) References Cited

U.S. PATENT DOCUMENTS

| | | | | |
|---|---|---|---|---|
| 2,070,839 A | * | 2/1937 | Place ........................... 52/177 |
| 4,021,055 A | * | 5/1977 | Okland ....................... 280/848 |
| 4,203,611 A | * | 5/1980 | Makela ....................... 280/163 |
| D293,667 S | * | 1/1988 | Weiler ....................... D12/203 |
| 4,721,319 A | * | 1/1988 | Dale ........................... 280/169 |
| 4,911,264 A | * | 3/1990 | McCafferty ................... 182/92 |
| 5,265,896 A | * | 11/1993 | Kravitz ........................ 280/163 |
| D364,597 S | * | 11/1995 | Branch ....................... D12/203 |
| 5,823,553 A | * | 10/1998 | Thompson ................ 280/164.1 |
| 5,944,332 A | * | 8/1999 | Lee et al. .................... 280/163 |
| 6,017,045 A | * | 1/2000 | Dermody ..................... 280/169 |
| 6,581,946 B2 | * | 6/2003 | Lund et al. .................. 280/163 |
| 6,588,781 B2 | * | 7/2003 | Pohill et al. ................. 280/163 |
| 2002/0158438 A1 | * | 10/2002 | Jacobs, Jr. ................... 280/163 |

FOREIGN PATENT DOCUMENTS

JP          6-72250        *   3/1994    ............ B60R/3/00

* cited by examiner

*Primary Examiner*—Avraham Lerner
(74) *Attorney, Agent, or Firm*—Carlson, Gaskey & Olds

(57) ABSTRACT

A guard assembly for a vehicle step includes a guard portion attached to the step blocking an opening and preventing road debris from being thrown against a body of the motor vehicle. The guard portion includes a first edge adjacent an outer edge of the vehicle step and an inner edge inboard of the vehicle. The inner edge is inboard of an inner edge of a tire mounted to the vehicle. A lip portion extends transverse from the guard portion and prevents road debris from being thrown between the guard portion and the underside of the motor vehicle.

23 Claims, 7 Drawing Sheets

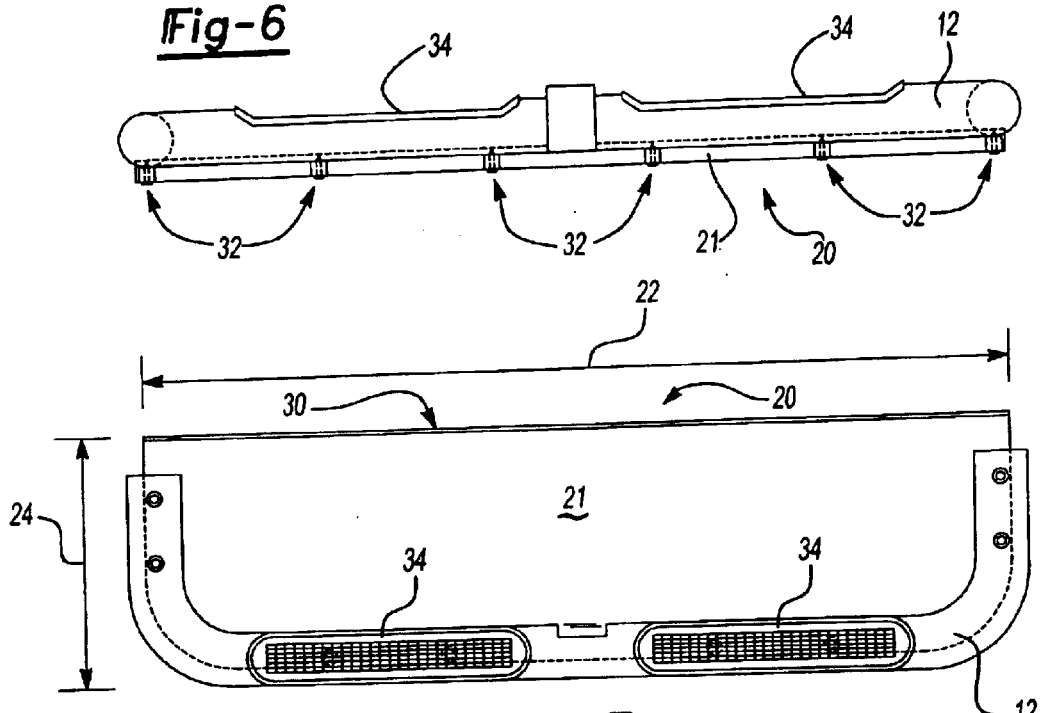
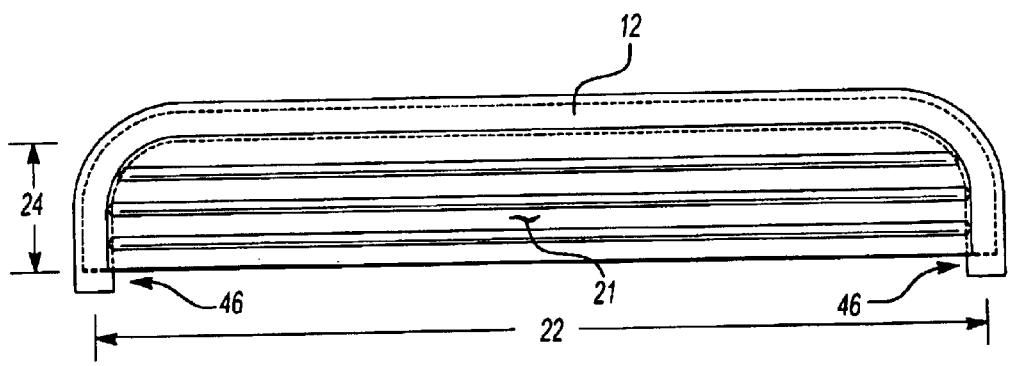
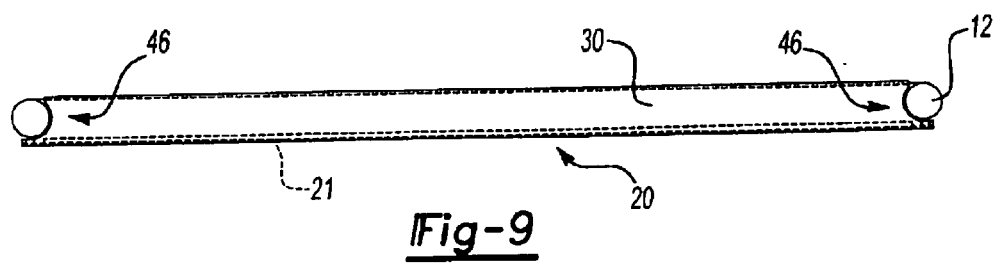

STONE GUARD FOR STEP BAR

This application claims priority to provisional application Ser. No. 60/358,762 filed on Feb. 22, 2002.

BACKGROUND OF THE INVENTION

This invention relates to a step bar for a motor vehicle and specifically for a stone guard assembly for a step bar.

Typically, vehicles designed for off-road use have an additional amount of ground clearance compared to other types of vehicles. The greater ground clearance increases the difficulty of getting into and out of the vehicle. For this reason, it is known to install a side step or step bar to the motor vehicle. The step bar aids a passenger or operator in entering and exiting the vehicle. Step bars can be installed as original equipment by the manufacturer or as an aftermarket item purchased and installed by the vehicle owner.

The increased ground clearance allows the motor vehicle to overcome obstacles and perform better in adverse road conditions such as snow or muddy terrain. However, increased ground clearance increases the amount of road debris and rocks kicked up by the motor vehicle tires and thrown against the body panels of the motor vehicle. Further, although many motor vehicles with increased ground clearance are designed for strictly work applications, off-road vehicles are popular and owned by many operators who may never drive the vehicle off road. Further, vehicles with traditional ground clearance are also susceptible to damage caused by road debris often found on deteriorated roads prevalent in large metropolitan areas. As appreciated, rock and road debris thrown up against the body and rocker panel may cause paint damage and dent the motor vehicle.

Typically, many vehicles include special coatings or paint applied to the rocker panel regions to protect against rock damage. These special coatings provide only a limited amount of protection and only slow the deterioration of paint on the body and rocker panels of the motor vehicle. Further, the deterioration of the rocker panel can create an unsightly cosmetic appearance that is highly undesirable to an operator or consumer who has a significant investment in the motor vehicle. In addition to the degradation of cosmetic appearance of the vehicle, chipped paint caused by rocks and road debris thrown up against the rocker panel can lead to premature corrosion of the body. Premature corrosion of the motor vehicle body and specifically the rocker panel may require significant costly repair.

In addition to the purely cosmetic degradation of the rocker panel of the motor vehicle, rocks and road debris, especially larger rocks encountered in off-road travel, can cause significant dents and damage to the rocker panel. Another significant problem encountered by rocks and road debris being thrown against the rocker panel is the increased amount of noise heard in the passenger compartment of the motor vehicle. As is appreciated, the popularity of such off-road type vehicles has lead to many purchasers of such vehicles using them in non-off-road applications where passenger comfort is a desired and expected characteristic of the motor vehicle. The increased noise emitted into the passenger compartment caused by road debris and rocks being thrown against the rocker panel is therefore undesirable.

Accordingly, it is desirable to design a device installable onto a step for a motor vehicle that substantially prevents damage to the surface coating of the motor vehicle.

SUMMARY OF THE INVENTION

An embodiment of this invention is a guard assembly for a vehicle step blocking road debris from being thrown against a vehicle body.

The vehicle step partially defines an opening allowing road debris to be thrown against the vehicle rocker panel. The guard assembly attaches to the step bar, blocking the opening and preventing road debris from being thrown against the rocker panel.

The guard assembly includes a guard portion suspended from a bottom surface of the step bar and extending inboard of the rocker panel and tires of the motor vehicle. A lip extends transverse to the guard portion preventing road debris from being thrown between the guard portion and an underside of the motor vehicle. An embodiment of this invention includes a lip extends upward from the guard providing a location for the application of decorative items such as lights, text messages, or illustrations.

Embodiments of the guard assembly are attached in various positions relative to the step. In one embodiment, the guard portion is attached to a bottom surface of the step and in another embodiment the guard attaches to a top surface of the step bar. In still another embodiment, the guard is mounted to an intermediate surface disposed between the top and bottom surfaces of the step bar.

The guard includes a plurality of fasteners extending through openings within the guard and secured to the step. One embodiment of the guard includes snap features securing the guard assembly to the step bar. The snap features eliminate the need for separate fasteners for securing the guard assembly to the step bar.

The rock guard assembly of this invention prevents and protects the rocker panel of the motor vehicle from rock and road debris being thrown up by the wheels of the motor vehicle.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 6 is a side view of the step bar with the guard;

FIG. 7 is a top view of the guard installed to the step bar;

FIG. 8 is a top view of the guard with a snap fit feature;

FIG. 9 is a side view of a guard with the snap fit feature

DETAILED DESCRIPTION OF A PREFERRED EMBODIMENT

Figure 1:
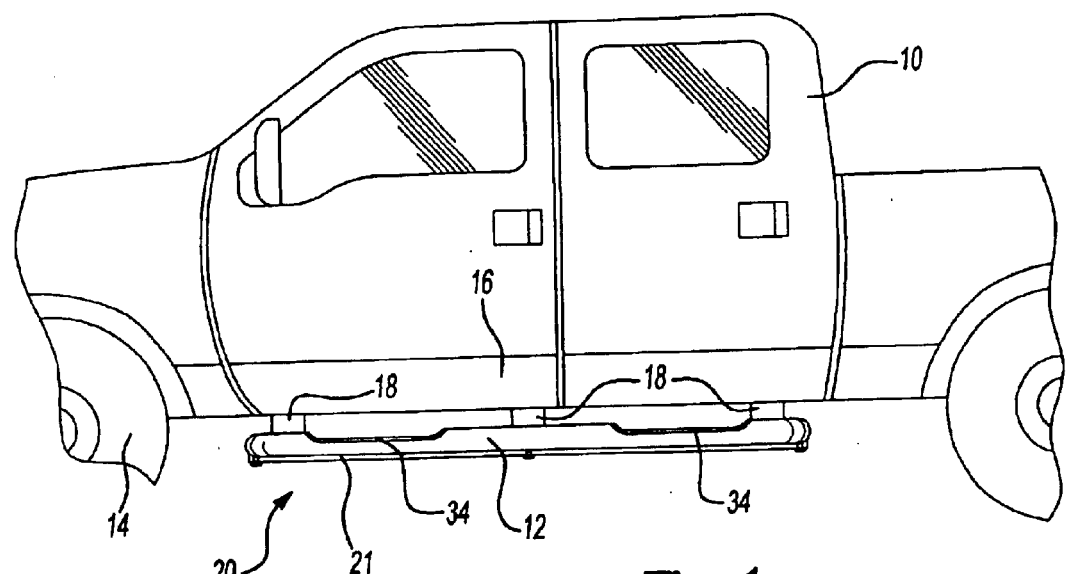
FIG. 1 is side view of a step bar with guard installed to a motor vehicle.
Figure 2:
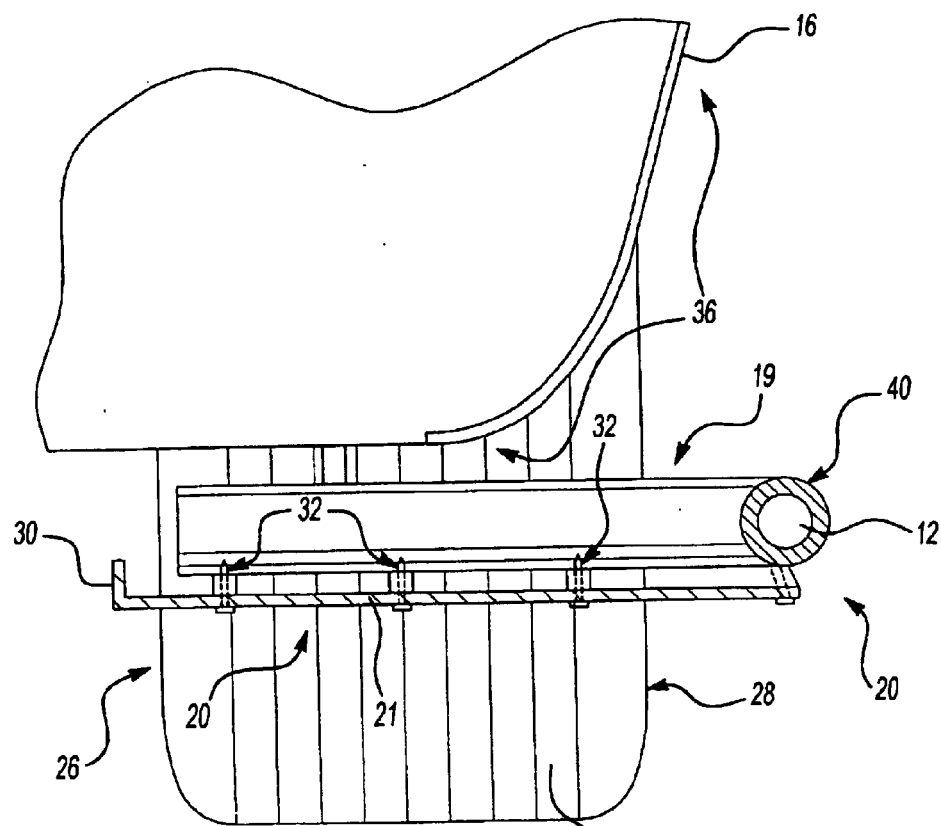
FIG. 2 is a sectional view of the guard installed to the step bar.

Referring to FIGS. 1 and 2, a motor vehicle 10 is shown including a step bar 12 supported under the motor vehicle by supports 18. The step bar 12 eases entrance and exit from the motor vehicle 10. Preferably, the step bar 12 is a tubular member extending from the underside of the motor vehicle 10 a distance from the motor vehicle 10 and specifically from the rocker panel 16.

The step bar 12 provides a convenient step for passengers to enter and exit the motor vehicle 10. The step bar 12 includes steps 34 to aid traction when using the step bar 12. The tubular member 12 does not provide significant protection to the rocker panel 16 of the motor vehicle 10 from rocks or road debris thrown up by tires 14. This is so because the step bar 12 includes only a tubular member extending from mounting points 18 underneath the motor vehicle 10. An opening 19 between the tubular member and the rocker panel 16 allows rocks and road debris to be thrown up against the rocker panel 16. Note that although preferably, the step bar 12 is tubular, it is within the contemplation of this invention to use any configuration of step as would be known to a worker skilled in the art.

A guard assembly 20 fastened to a bottom surface of the step bar 12 blocks the opening partially defined by the step bar 12. The guard assembly 20 prevents road debris from being thrown up against the rocker panel by blocking the opening. Preferably, the guard assembly 20 is suspended from the bottom surface of the step bar 12 and extends inboard of the step bar 12 and the rocker panels 16 of the motor vehicle 10.

Figure 3:
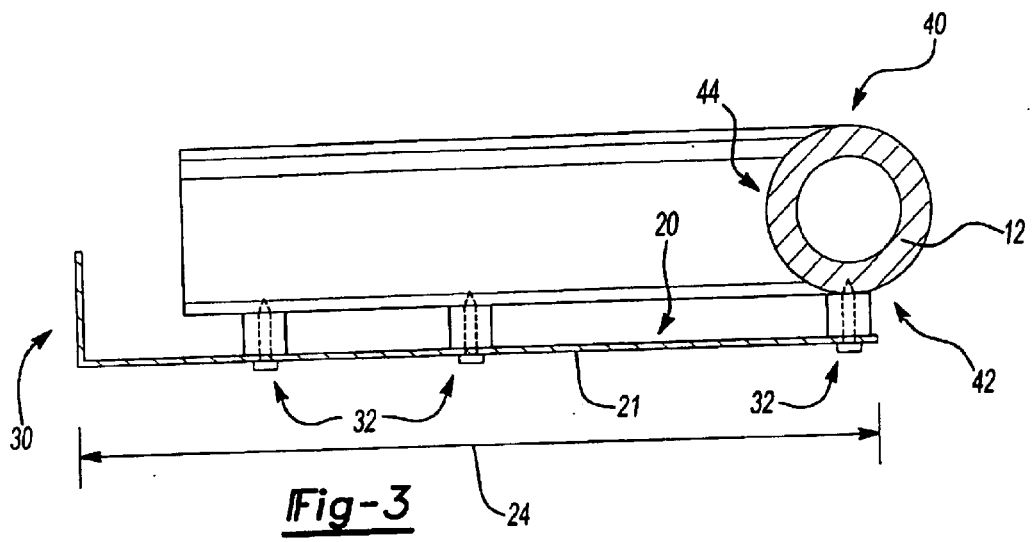
FIG. 3 is a sectional view of one embodiment of the guard installed to a step bar.
Figure 4:
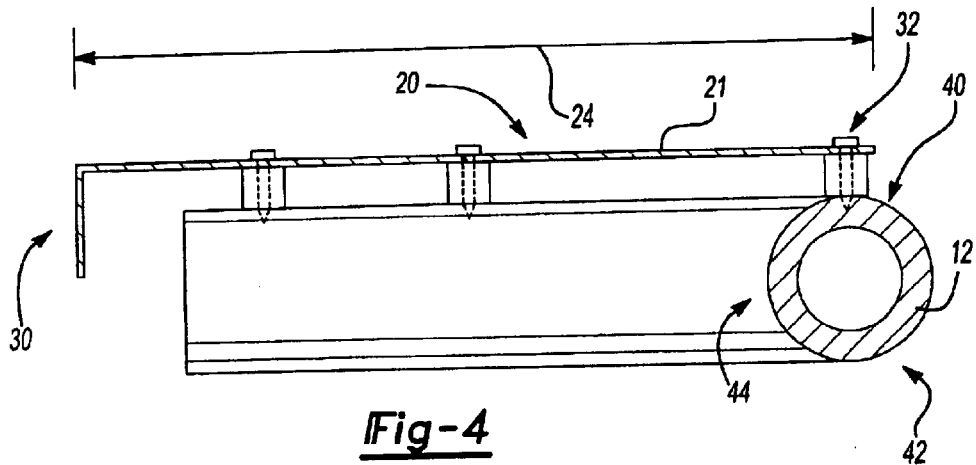
FIG. 4 is a sectional view of another embodiment of the guard installed to a step bar.
Figure 5:
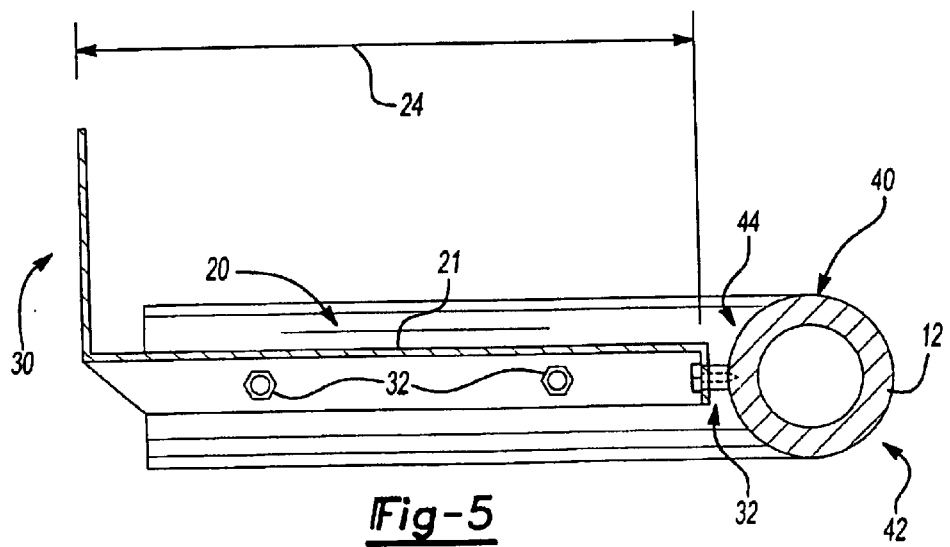
FIG. 5 is a sectional view of yet another embodiment of the guard installed to a step bar.

Referring to FIGS. 3–5, although preferably the guard assembly 20 is attached to a bottom surface of the step bar 12 (FIG. 3), other mounting configurations are within the contemplation of this invention. One embodiment includes the guard attached to an inner surface 44 toward the top of the step bar 12 (FIG. 4). Preferably, the guard 20 is attached to the step bar 12 such that it does not form a load baring structure that is stepped on to gain access to the motor vehicle 12. The guard 20 is attached to the step bar 12 such that the step bar 12 will bear any load from an occupant entering or exiting the motor vehicle 10. Another embodiment includes mounting of the guard assembly 20 on the inner surface 44 disposed between the top and bottom surfaces 40,42 of the step bar 12 (FIG. 5). Different mounting configurations of the guard assembly 20 provide adaptability to specific vehicle configurations. A worker skilled in the art would understand that specific mounting configurations of the guard are application dependent and would fall with the contemplation of this invention.

Referring to FIG. 2, the guard assembly 20 includes a guard portion 21 preferably comprised of a sheet member extending from an outermost point of the step bar 12 to a point inboard of the tires 14. The motor vehicle rocker panel 16 is susceptible to rock debris thrown from the tires 14 through the opening 19 in the range indicated at 36. The guard assembly 20 includes a plurality of attachment points 32. Each attachment point 32 includes a threaded fastener 38 extending through the guard portion 21 into the step bar 12. Although preferably threaded fasteners 38 are used to secure the guard assembly 20 to the step bar 12, it is within the contemplation of this invention to use any type of fastener known to a worker skilled in the art.

Preferably, the guard portion 21 extends to a point inboard of the inboard portion 26 of the tire 14. Although, preferably the guard portion 21 extends inboard of the tires 14, it is within the contemplation of this invention that the guard portion 21 extends inboard of the step bar 12 at any point that would provide protection of the rocker panel 16 from road debris.

Referring to FIGS. 6–7, the guard assembly 20 blocks rock and road debris from being thrown between the outermost portion of the step bar 12 up and into the rocker panel 16. Preferably, the guard assembly 20 includes the guard portion 21 that is a substantially rectangular pan suspended below the step bar 12 and extending to a point inboard of the tires 14 (FIG. 2) of the motor vehicle 10. It is within the contemplation of this invention to provide a guard portion 21 of any shape adapted to the specific configuration of the motor vehicle 10 and the step bar 12.

The guard portion 21 includes a width 24 and a length 22. Preferably, the width 24 is such that the guard portion 21 extends inboard of the vehicle tire 14 (FIG. 2). The length 22 of the guard portion 21 is application specific, and a worker skilled in the art would understand that the length is configured according to the specific configuration of the motor vehicle 10 and the step bar 12.

The guard 21 is preferably fabricated from a flat sheet of metal that is attached by a plurality of fasteners at attachment points 32. It should be understood that the type of fastener used to attached the guard 21 to the step bar 12 may be of any type known to a worker skilled in the art, such as screws, rivets or bolts. Further, the guard 21 may be attached by other means such as welding, molding, snap type fits and the like. Further, referring to FIGS. 8 and 9, an alternate embodiment of the guard assembly 20 is shown including snap features 46. The snap features 46 provide a temporary holding mechanism for the step bar to ease installation. The snap features 46 hold one side of the guard 20 to the step bar 12 while fasteners at attachment points 32 are secured to attach the guard to the step bar 12. The snap features 46 shown in FIGS. 8 and 9 are only one possible configuration of a snap feature within the contemplation of this invention, other configurations as are known to a worker skilled are within the scope of this invention.

Although a flat sheet of non-corrosive material such as stainless steel is preferable, it is within the contemplation of this invention that the guard 20 may be fabricated from any materials such as plastics, fiberglass, steel grate, powder coated sheet steel or other such materials as one skilled in the art would understand is applicable to such applications. The flat sheet comprising the guard portion 21 may includes various strengthening features as are known to a worker skilled in the art, including grooved, ribs, channels, groove, along with the addition of strengthening members attached to the guard 20 to provide the desired additional strength.

Figure 10A:
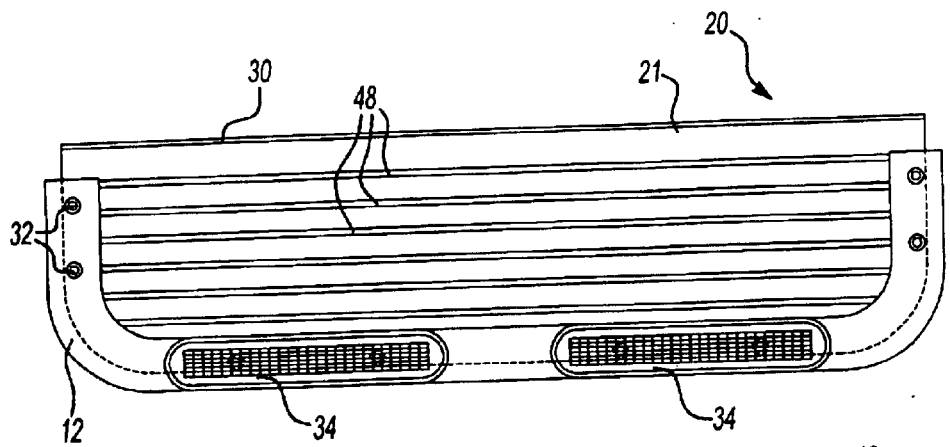
FIG. 10A is a top view of another embodiment of the guard.
Figure 10B:
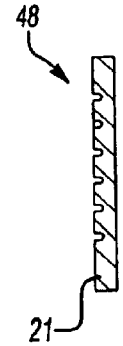
FIG. 10B is a cross section of the guard of FIG. 10A.

Referring to FIGS. 10A–B, an alternate embodiment of the guard portion 21 is shown including a plurality of grooves 48. The grooves 48 provide additional traction and strength to the guard portion 21. FIG. 8B illustrates a cross-section of the guard portion 21 including grooves 48. It should by understood that any groove configuration as is known to a worker skilled in the art is within the contemplation of this invention.

Figure 11A:
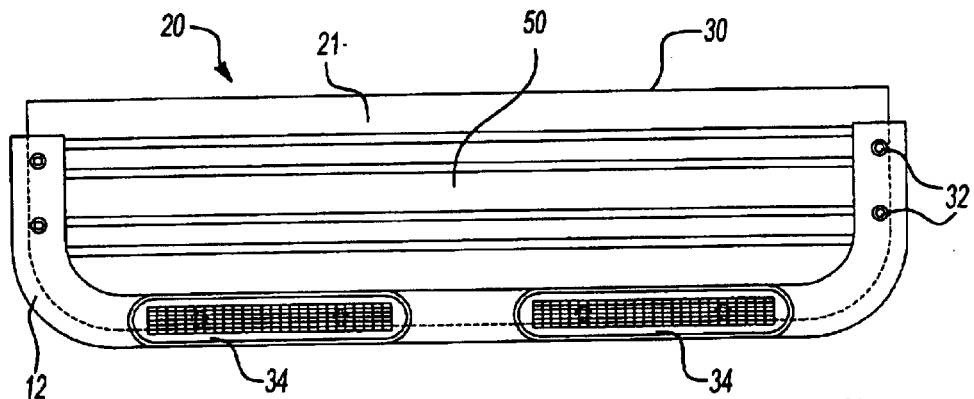
FIG. 11A is a top view of another embodiment of the guard.
Figure 11B:
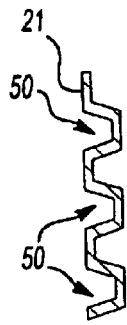
FIG. 11B is a cross section of the guard of FIG. 11A.

Referring to FIGS. 11A and 11B, another embodiment of the guard portion 21 includes a series of alternating channels 50 forming a corrugated guard portion 21. The alternating channels 50 are strengthening features that reinforce the guard portion 21. FIG. 11B is a cross-section of the guard portion 21 with the alternating channels 50. As appreciated, any configuration of a corrugated or alternating channel guard portion 21 is within the contemplation of this invention.

Preferably, the guard 21 includes only the mounting openings at each of the attachment points 32, however, it is within the contemplation of this invention to use a guard 20 including openings throughout the guard 20 to facilitate mounting and water drainage. Further, the guard 20 is adaptable to the specific applications of the step bar and motor vehicle. As would be understood by a person skilled in the art, the exact length and width of the guard 20 is determined on an application specific basis.

Figure 12A:
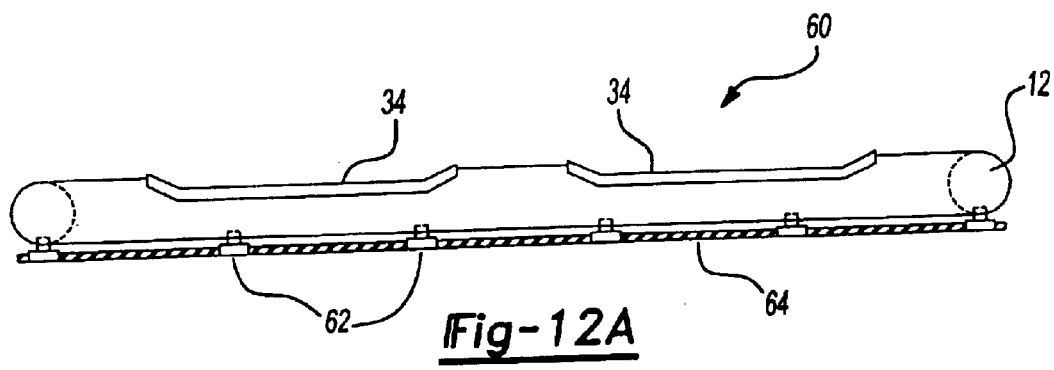
FIG. 12A is a side view of another embodiment of the guard
Figure 12B:
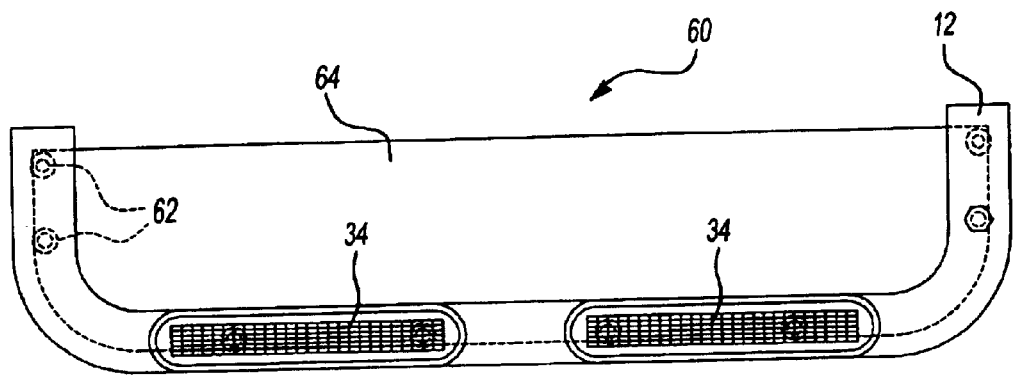
FIG. 12B is a top view of the embodiment of FIG. 12A.

Referring to FIGS. 12A–B, another embodiment of a guard assembly is shown and generally indicated at 60. In this embodiment, the guard portion 64 includes a flexible sheet of flexible material. The flexible material is preferably a vinyl composite including a plurality of snap members 62. The snap members 62 snap fit the vinyl material to the bottom of the step bar to block the opening between the step bar 12 and the motor vehicle 10. Further, any type of flexible material as is known to a worker skilled in the art is within the contemplation of this invention. Such material can include tarp, canvas, cloth or other like materials secured to the bottom portion of the step bar 12.

Referring to FIG. 2, preferably, the guard assembly 20 includes a lip 30 substantially transverse to the guard portion 21. The lip 30 extends upward on an inboard portion of the guard 20. The lip 30 aids in protection of the rocker panel 16 of the motor vehicle 10 by preventing rocks and road debris from being thrown between the guard portion 21 and the bottom of the motor vehicle 10. The distance at which the lip 30 extends from the guard 20 may be of any length designed to protect the rocker panel 16.

Referring to FIG. 4, the lip 30 may also extend downwardly from the guard portion 21 to prevent road debris from being thrown up against the rocker panel 16.

In the embodiment shown in FIG. 4, the guard portion 21 is mounted to the top surface of the step bar 21. The lip 30 corresponding to this mounting configuration extends downward to protect against road debris being thrown up into the rocker panel 16. The specific configuration of the lip 30 is application specific and all configurations as is known to a worker skilled in the art are within the contemplation of this invention.

Figure 13:
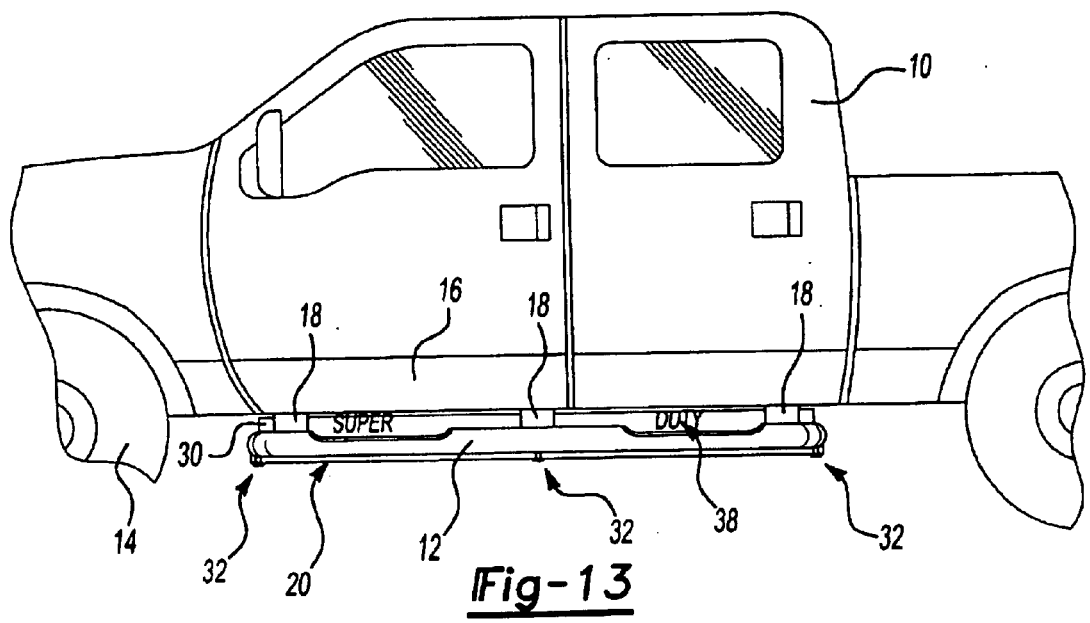
FIG. 13 is a side view of the guard including a design applied to a lip of the guard.

Referring to FIG. 13, another embodiment of the lip 30 extend further upward from the guard 30 to provide a location for the application of a decorative item 38 such as lights, text messages, or illustrations according to the desire of the owner of the motor vehicle 10.

Figure 14:
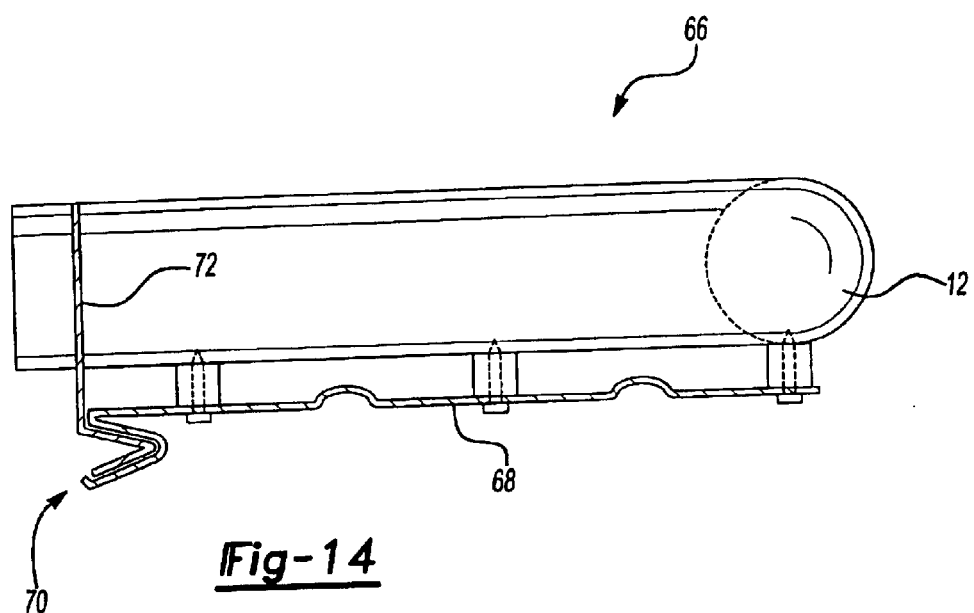
FIG. 14 is a side view of a guard with an interlocking lip potion.
Figure 15:
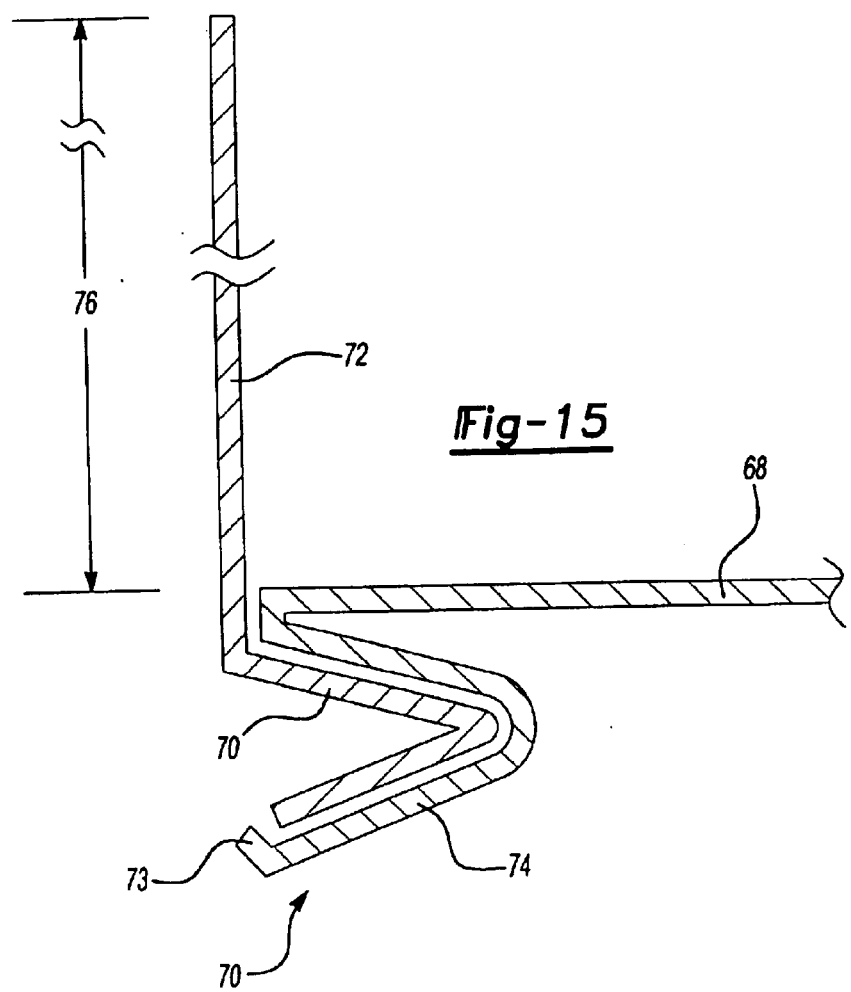
FIG. 15 is an enlarged view of the interlocking lip portion.

Referring to FIGS. 14–15, another embodiment of the guard is generally indicated at 66 and includes a guard portion 68 with an interlocking portion 74. The interlocking portion 74 includes a "V" shaped section 74 with a ridge 73. The lip portion 70 includes a corresponding interlocking section 70. The interlocking section 70 is also "V" shaped and fits within the interlocking portion 74 of the guard 68 and retained by the ridge 73. The lip 72 is assembled separately to provide for differing motor vehicle configurations. Different motor vehicle and step bar combinations will require lips 72 if differing lengths. The length 76 can be of any length desired and according to the specific applications. Further, the lip 72 is assembled separately from the guard 68 to allow lips 72 of differing lengths 76 to tailor to each specific application.

Figure 16:
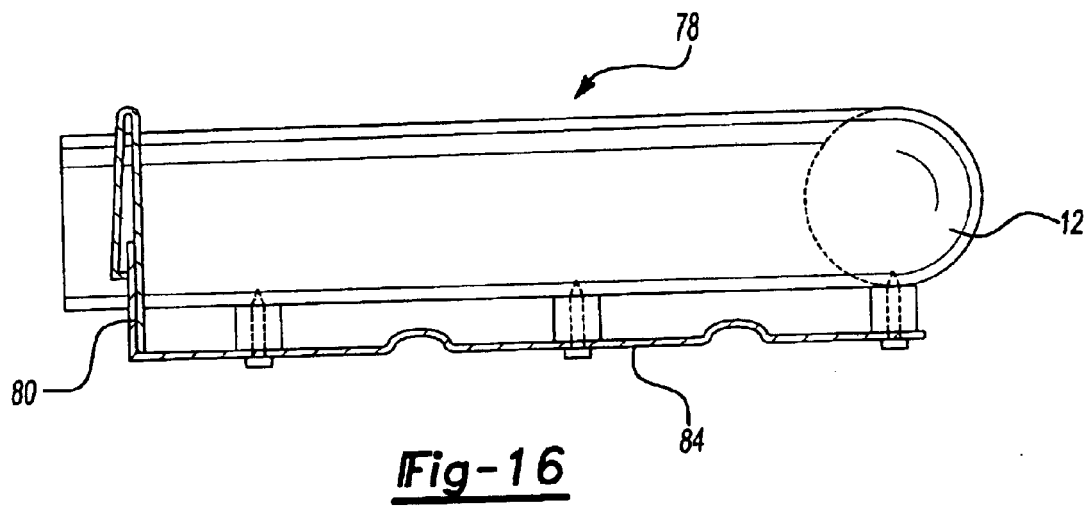
FIG. 16 is a side view of a lip extension member.
Figure 17:
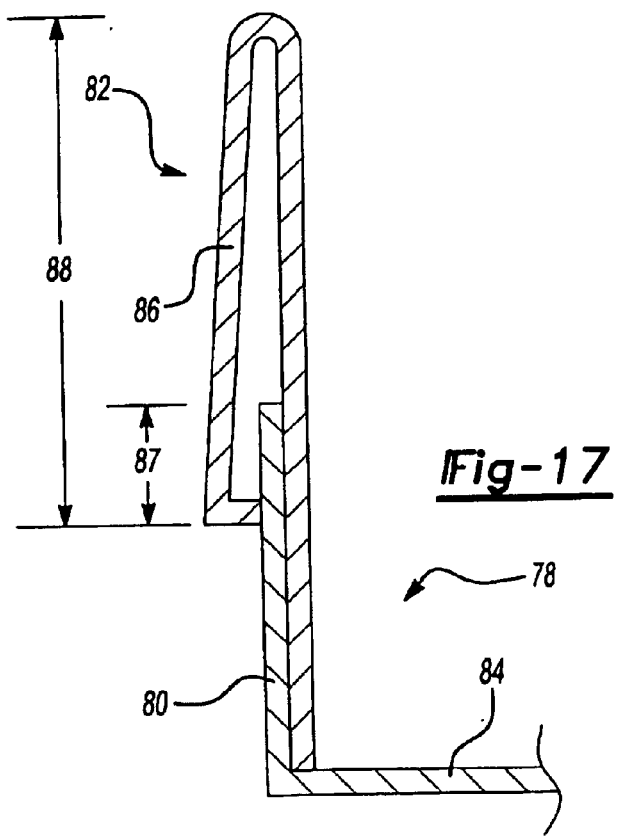
FIG. 17 is an enlarged view of the lip extension member.

Referring to FIGS. 16–17, another embodiment of the guard assembly is generally indicated at 78 and includes a guard 84 with a lip 80 of a standard length 87. Attached to the lip 87 is an extension member 82. The extension member is generally "J" shaped with a clip portion 869. The clip portion 86 clamps onto the lip 80 of the guard 84. The extension member 82 provides for an overall length 88 to provide for the desired height of the guard 84 according to application specific requirements. Note that the it is within the contemplation of this invention to use any type of attachment configuration as is known to a worker skilled in the art to attach the separate lip to the guard portion, such as threaded fasteners, clamps, rivets The foregoing description is exemplary and not just a material specification. The invention has been described in an illustrative manner and should be understood that the terminology used is intended to be in the nature of words of description rather than of limitation. Many modifications and variations of the present invention are possible in light of the above teachings. The preferred embodiments of this invention have been disclosed. However, one of ordinary skill in the art would recognize that certain modifications are within the scope of this invention.

What is claimed is:

1. A guard assembly for a generally U-shaped vehicle step comprising:
   a guard portion attachable for blocking an opening defined by the generally U-shaped vehicle step, and
   a fastener and a spacer disposed between said guard portion and the vehicle step for spacing said guard portion apart from an underside of said U-shaped vechicle step.

2. The assembly of claim 1, wherein said guard portion includes a first edge adjacent an outer edge of said step and an inner edge inboard of the vehicle.

3. The assembly of claim 1, wherein said guard portion includes a plurality of grooves.

4. The assembly of claim 1, wherein said guard portion includes a plurality of alternating channels extending parallel with said vehicle step.

5. The assembly of claim 1, further including a lip portion transverse from said guard portion.

6. The assembly of claim 5, wherein said guard and said lip portion includes corresponding interlocking portions for attachment of said lip portion to said guard.

7. The assembly of claim 6, wherein said interlocking portions are "V" shaped, and said interlocking portion of said guard includes a ridge portion for securing said interlocking portion of said lip.

8. The assembly of claim 5, further including an extension portion attachable to said lip portion to extend a length of said lip portion above said guard portion.

9. The assembly of claim 8, wherein said extension portion includes a clip section securing said extension portion to said lip portion.

10. The assembly of claim 5, further including a decorative design applied to said lip portion.

11. The assembly of claim 1, fabricated from a plastic material.

12. The assembly of claim 1, fabricated from a corrosion resistant material.

13. The assembly of claim 1, wherein said guard portion includes a snap mechanism corresponding to said step for attachment to said step.

14. The assembly of claim 1, wherein said guard portion includes a flexible material attached to said vehicle step by a plurality of snaps.

15. The assembly as recited in claim 1, comprising a lip disposed on an inner edge of said guard portion, said lip extending transversely to said guard protection.

16. A vehicle step assembly for a motor vehicle comprising:
   a generally U-shaped step portion attachable to the motor vehicle, said step portion defining an opening; and
   a guard attached to said step portion for blocking said opening, and including a fastener and a spacer disposed between said guard and said step portion for spacing said guard apart from an underside of said step portion.

17. The assembly of claim 16, wherein said guard includes a first edge adjacent an outer edge of said step and an inner edge inboard of the vehicle.

18. The assembly of claim 16, wherein said guard includes a flexible material attached by a series of snaps.

19. The assembly of claim 16, wherein said guard includes a lip extending transverse relative to said guard.

20. The assembly of claim 19, wherein said guard and lip including interlocking portions to detachably mount said lip to said guard.

21. The assembly as recited in claim 16, wherein said vehicle step is tubular.

22. A guard assembly for a generally U-shaped vehicle step comprising:
   a guard portion attachable for blocking an opening defined by the generally U-shaped vehicle step, wherein said guard portion is spaced apart from an underside of said vehicle step, wherein said guard portion includes a first edge adjacent an outer edge of said step and an inner edge inboard of the vehicle and said inner edge is inboard of an inner edge of a tire mounted to the vehicle.

23. A vehicle step assembly for a motor vehicle comprising:
   a generally U-shaped step portion attachable to the motor vehicle, said step portion defining an opening; and
   a guard attached to said step portion for blocking said opening, said guard is spaced apart from an underside of said step portion, wherein said guard includes a first edge adjacent an outer edge of said step and an inner edge inboard of the vehicle and said inner edge of said guard extends inboard of a tire of the motor vehicle.

\* \* \* \* \*